US007594328B2

(12) United States Patent
Pugliese, Jr. et al.

(10) Patent No.: US 7,594,328 B2
(45) **Date of Patent: *Sep. 29, 2009**

(54) METHOD OF FORMING A SLOTTED SUBSTRATE WITH PARTIALLY PATTERNED LAYERS

(75) Inventors: Roberto A. Pugliese, Jr., Tangent, OR (US); Mark H. MacKenzie, Corvallis, OR (US); Thomas E. Pettit, Corvallis, OR (US); Victorio A. Chavarria, Corvallis, OR (US); Steven P Storm, Corvallis, OR (US); Allen H Smith, Corvallis, OR (US); Tony Cruz-Uribe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

This patent is subject to a terminal disclaimer.

(21) Appl. No.: 11/069,421

(22) Filed: Feb. 28, 2005

(65) Prior Publication Data

US 2005/0206687 A1 Sep. 22, 2005

Related U.S. Application Data

(63) Continuation-in-part of application No. 10/679,097, filed on Oct. 3, 2003, now Pat. No. 6,945,634.

(51) Int. Cl.
*B23P 17/00* (2006.01)
*B41J 2/045* (2006.01)

(52) U.S. Cl. .......................... 29/890.1; 29/611; 29/830; 29/831; 29/832; 347/71

(58) Field of Classification Search ................ 29/890.1, 29/830, 831, 832, 611; 216/27, 4, 48; 347/63, 347/61, 68–71, 56, 62, 65; 430/311; 451/38
See application file for complete search history.

(56) References Cited

U.S. PATENT DOCUMENTS

| | | | | | |
|---|---|---|---|---|---|
| 5,387,314 | A * | 2/1995 | Baughman et al. | ............ | 216/27 |
| 5,441,593 | A * | 8/1995 | Baughman et al. | ............ | 216/27 |
| 5,519,423 | A * | 5/1996 | Moritz et al. | ................. | 347/65 |
| 6,109,733 | A * | 8/2000 | Raisanen et al. | .............. | 347/63 |
| 6,126,276 | A * | 10/2000 | Davis et al. | ................... | 347/65 |
| 6,238,269 | B1 * | 5/2001 | Pollard et al. | ................. | 451/36 |
| 6,276,787 | B1 * | 8/2001 | Sakanobe et al. | ............. | 347/86 |
| 6,315,397 | B2 * | 11/2001 | Truninger et al. | ............. | 347/63 |
| 6,412,918 | B1 * | 7/2002 | Chen et al. | ..................... | 347/56 |
| 6,441,838 | B1 * | 8/2002 | Hindman et al. | .............. | 346/63 |
| 6,502,926 | B2 * | 1/2003 | Cook et al. | .................... | 347/63 |
| 6,513,913 | B2 * | 2/2003 | Schulte et al. | ................ | 347/63 |
| 6,648,732 | B2 * | 11/2003 | Pugliese et al. | ............... | 451/38 |
| 6,945,634 | B2 * | 9/2005 | Pugliese et al. | ............... | 347/63 |
| 2002/0102918 | A1 * | 8/2002 | Pugliese, Jr. et al. | | |

* cited by examiner

*Primary Examiner*—Derris H Banks
*Assistant Examiner*—Tai Nguyen

(57) ABSTRACT

A method of forming a slotted substrate that includes patterning a thin film over a substrate so that at least a portion of the substrate within a slot region is not covered by the thin film. In addition, a slot is formed in the substrate through the slot region that extends through the substrate and the thin film, wherein a chip count in a shelf surrounding the slot is minimized when the slot is formed in the substrate through the thin film in the slot region.

7 Claims, 5 Drawing Sheets

METHOD OF FORMING A SLOTTED SUBSTRATE WITH PARTIALLY PATTERNED LAYERS

CROSS-REFERENCE TO RELATED APPLICATIONS

This application is a continuation in part of U.S. patent application Ser. No. 10/679,097 filed on Oct. 3, 2003 now U.S. Pat. No. 6,945,634 by Pugliese et al., and entitled "Thin Film Coating Of A Slotted Substrate And Techniques For Forming Slotted Substrates".

FIELD OF THE INVENTION

The present invention relates to substrates such as those used in inkjet printheads and the like. In particular, a substrate is coated with at least one thin film layer, and a slot region extends through the substrate and the thin film layer.

BACKGROUND OF THE INVENTION

Various inkjet printing arrangements are known in the art and include both thermally actuated printheads and mechanically actuated printheads. Thermal actuated printheads tend to use resistive elements or the like to achieve ink expulsion, while mechanically actuated printheads tend to use piezoelectric transducers or the like.

A representative thermal inkjet printhead has a plurality of thin film resistors provided on a semiconductor substrate. A nozzle plate and a barrier layer are provided on the substrate and define the firing chambers about each of the resistors. Propagation of a current or a "fire signal" through a resistor causes ink in the corresponding firing chamber to be heated and expelled through the corresponding nozzle.

Ink is typically delivered to the firing chamber through a feed slot that is machined in the semiconductor substrate. The substrate usually has a rectangular shape, with the slot disposed longitudinally therein. Resistors are typically arranged in rows located on both sides of the slot and are preferably spaced approximately equal distances from the slot so that the ink channel length at each resistor is approximately equal. The width of the print swath achieved by one pass of a printhead is approximately equal to the length of the resistor rows, which in turn is approximately equal to the length of the slot.

Feed slots have typically been formed by sand drilling (also known as "sand slotting"). This method is a rapid, relatively simple and scalable process. The sand blasting method is capable of forming an opening in a substrate with a high degree of accuracy, while generally avoiding substantial damage to surrounding components and materials. Also, it is capable of cutting openings in many different types of substrates without the generation of excessive heat. Furthermore, it allows for improved relative placement accuracies during the production process.

While sand slotting affords these apparent benefits, sand slotting is also disadvantageous in that it may cause microcracks in the semiconductor substrate that significantly reduce the substrates fracture strength, resulting in significant yield loss due to cracked die. Low fracture strength also limits substrate length which in turn adversely impacts print swath height and overall print speed.

In addition, sand slotting typically causes chips to the substrate on both the input and output side of the slot. This chipping causes two separate issues. Normally the chipping is tens of microns large and limits how close the firing chamber can be placed to the edge of the slot. Occasionally the chipping is larger and causes yield loss in the manufacturing process. The chipping problem is more prevalent as the desired slot length increases and the desired slot width decreases.

SUMMARY OF THE INVENTION

A method of forming a slotted substrate that includes patterning a thin film over a substrate so that at least a portion of the substrate within a slot region is not covered by the thin film. In addition, a slot is formed in the substrate through the slot region that extends through the substrate and the thin film, wherein a chip count in a shelf surrounding the slot is minimized when the slot is formed in the substrate through the thin film in the slot region.

DETAILED DESCRIPTION

Materials, such as metal, dielectric, and polymer, that are coated over a substrate reduce chip size and chip number in the substrate resulting from the slot formation. Generally, the number of layers and the thickness of each of the layers directly correlate to a reduction in chip size and number. In another embodiment, ductile or non-brittle materials, with the ability to undergo large deformation before fracture, are used with the present invention. In yet another embodiment, a layer coating the substrate places the structure under compressive stress. This compressive stress counteracts tensile forces that the coated substrate structure undergoes during slot formation.

Generally, the number of layers deposited over the substrate, the thickness of the layers that are deposited, the compressive stress amount in the layers, and the ductility of the material in the layers, each directly correlate to a reduction in the number of chips in the shelf of the die as described and discussed in more detail below.

Figure 1:
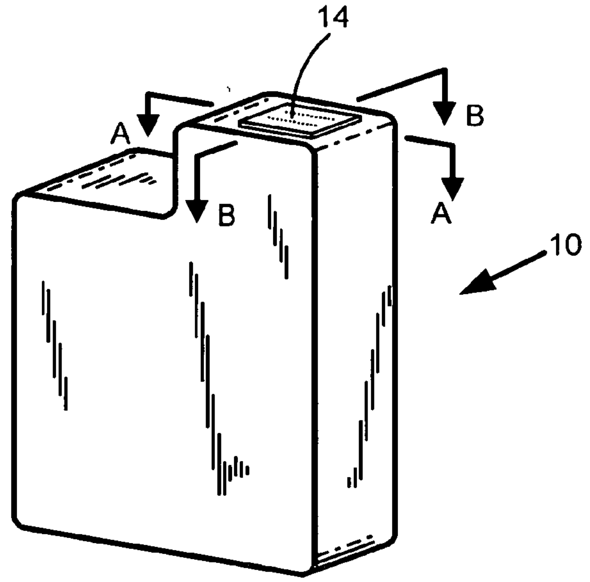
FIG. 1 illustrates an inkjet cartridge with a printhead of the present invention.

FIG. 1 is a perspective view of an inkjet cartridge 10 with a printhead 14 of the present invention.

Figure 2A:
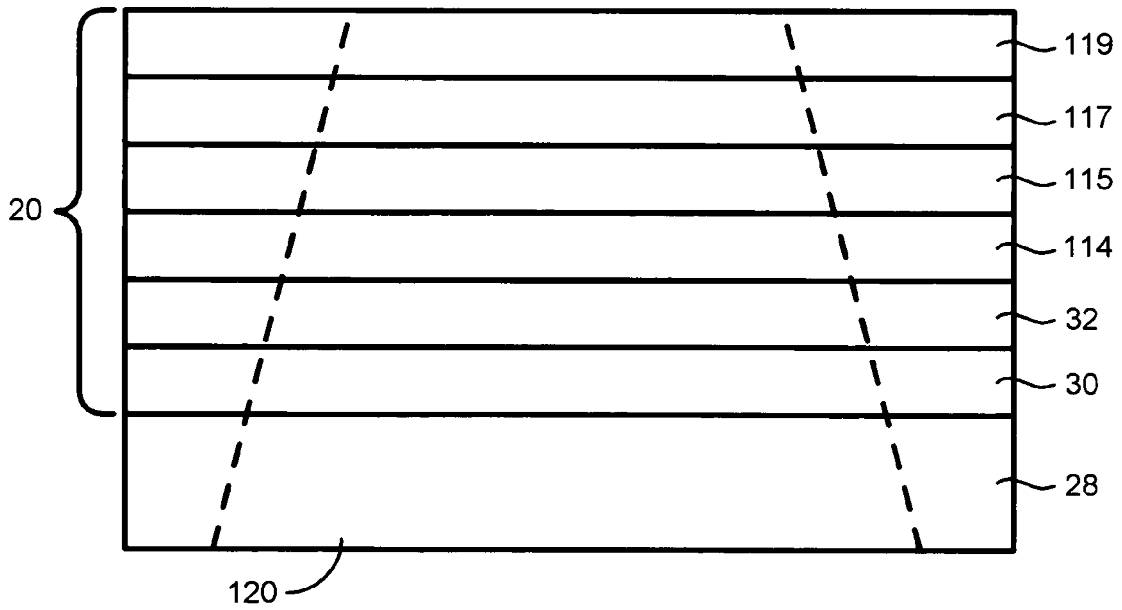
FIG. 2A illustrates a side cross-sectional schematic view through A-A of FIG. 1, wherein thin film coatings have been applied over a substrate in the present invention.
Figure 2B:
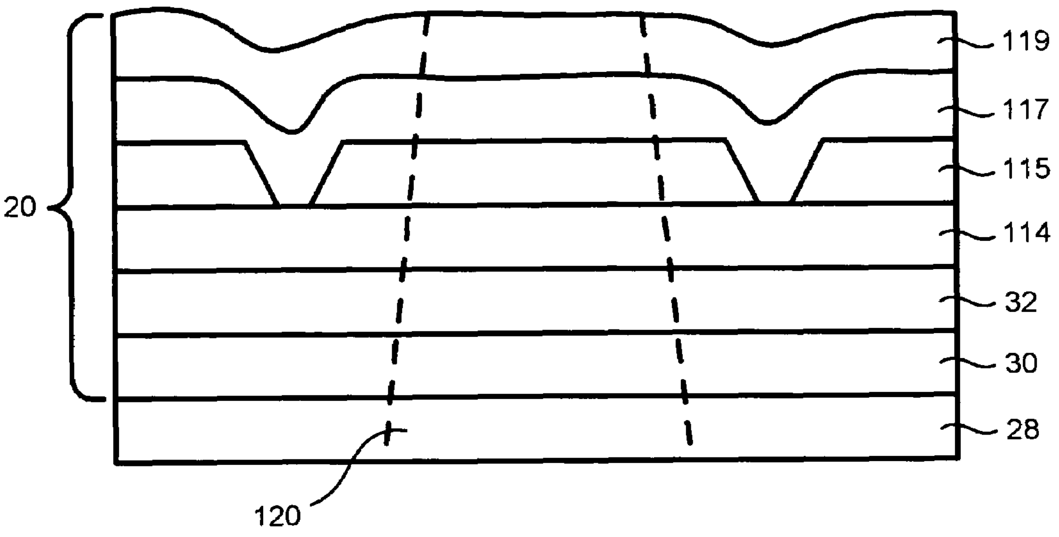
FIG. 2B illustrates a front cross-sectional schematic view of thin film coatings and substrate through section B-B of FIG. 1.

FIGS. 2A and 2B illustrate side and front cross-sectional schematic partial views through A-A and B-B of FIG. 1, respectively. In FIGS. 2A and 2B, a thin film stack 20 has been applied over a substrate 28. An area of a slot region 120 through the thin film stack 20 and the substrate 28 is shown in dashed lines. As layers of the thin film stack 20 are deposited over the substrate, the slot region is extended through the thin film stack 20.

The process of fabricating the printhead 14 begins with the substrate 28. In one embodiment, the substrate is a monocrystalline silicon wafer as is known in the art. A wafer of approximately 525 microns for a four-inch diameter or approximately 625 microns for a six-inch diameter is appropriate. In one embodiment, the silicon substrate is p-type, lightly doped to approximately 0.55 ohm/cm.

Alternatively, the starting substrate may be glass, a semiconductive material, a Metal Matrix Composite (MMC), a Ceramic Matrix Composite (CMC), a Polymer Matrix Composite (PMC) or a sandwich Si/xMc, in which the x filler material is etched out of the composite matrix post vacuum processing.

A capping layer 30 covers and seals the substrate 28, thereby providing a gas and liquid barrier layer. Because the capping layer 30 is a barrier layer, fluid is unable to flow into the substrate 28. Capping layer 30 may be formed of a variety of different materials such as silicon dioxide, aluminum oxide, silicon carbide, silicon nitride, and glass. The use of an electrically insulating dielectric material for capping layer 30 also serves to insulate substrate 28 from conductor traces—via interconnects (not shown). The capping layer may be formed using any of a variety of methods known to those of skill in the art such as sputtering, evaporation, and plasma enhanced chemical vapor deposition (PECVD). The thickness of capping layer 30 ay be any desired thickness sufficient to cover and seal the substrate. Generally, the capping layer has a thickness of up to about 1 to 2 microns.

In one embodiment, the capping layer is field oxide (FOX) 30 which is thermally grown 205 on the exposed substrate 28. The process grows the FOX into the silicon substrate as well as depositing it on top to form a total depth of approximately 1.3 microns. Because the FOX layer pulls the silicon from the substrate, a strong chemical bond is established between the FOX layer and the substrate. This layer will isolate the MOSFETs, to be formed, from each other and serves as part of the thermal inkjet heater resistor oxide underlayer.

A phosphorous-doped (n+) silicon dioxide interdielectric, insulating glass layer (PSG) 32 is deposited by PECVD techniques. Generally, the PSG layer has a thickness of up to about 1 to 2 microns. In one embodiment, this layer is approximately 0.5 micron thick and forms the remainder of the thermal inkjet heater resistor oxide underlayer. In another embodiment, the thickness range is about 0.7 to 0.9 microns.

A mask is applied and the PSG layer etched to provide openings in the PSG for interconnect vias for the MOSFET. Another mask is applied and etched to allow for connection to the base silicon substrate 28. The formation and use of the vias is set forth in U.S. Pat. No. 4,862,197 to Stoffel (assigned to the common assignee herein) for a "Process for Manufacturing Thermal Ink Jet Printhead and Integrated Circuit (IC) Structures Produced Thereby," incorporated by reference in its entirety.

Firing resistors are formed by depositing a layer of resistive materials 114 over the structure. In one embodiment, sputter deposition techniques are used to deposit a layer of tantalum aluminum 114 composite across the structure. The composite has a resistivity of approximately 30 ohms/square. Generally, the resistor layer has a thickness of up to about 1 to 2 microns.

A variety of suitable resistive materials are known to those of skill in the art including tantalum aluminum, nickel chromium, and titanium nitride, which may optionally be doped with suitable impurities such as oxygen, nitrogen, and carbon, to adjust the resistivity of the material. The resistive material may be deposited by any suitable method such as sputtering, and evaporation. Typically, the resistor layer has a thickness in the range of about 100 angstroms to 300 angstroms. However, resistor layers with thicknesses outside this range are also within the scope of the invention.

A conductive layer 115 is applied over the resistive material 114. The conductive layer may be formed of any of a variety of different materials including aluminum/copper (4%), copper, and gold, and may be deposited by any method, such as sputtering and evaporation. Generally, the conductive layer has a thickness of up to about 1 to 2 microns. In one embodiment, sputter deposition is used to deposit a layer of aluminum 115 to a thickness of approximately 0.5 micron.

Figure 3:
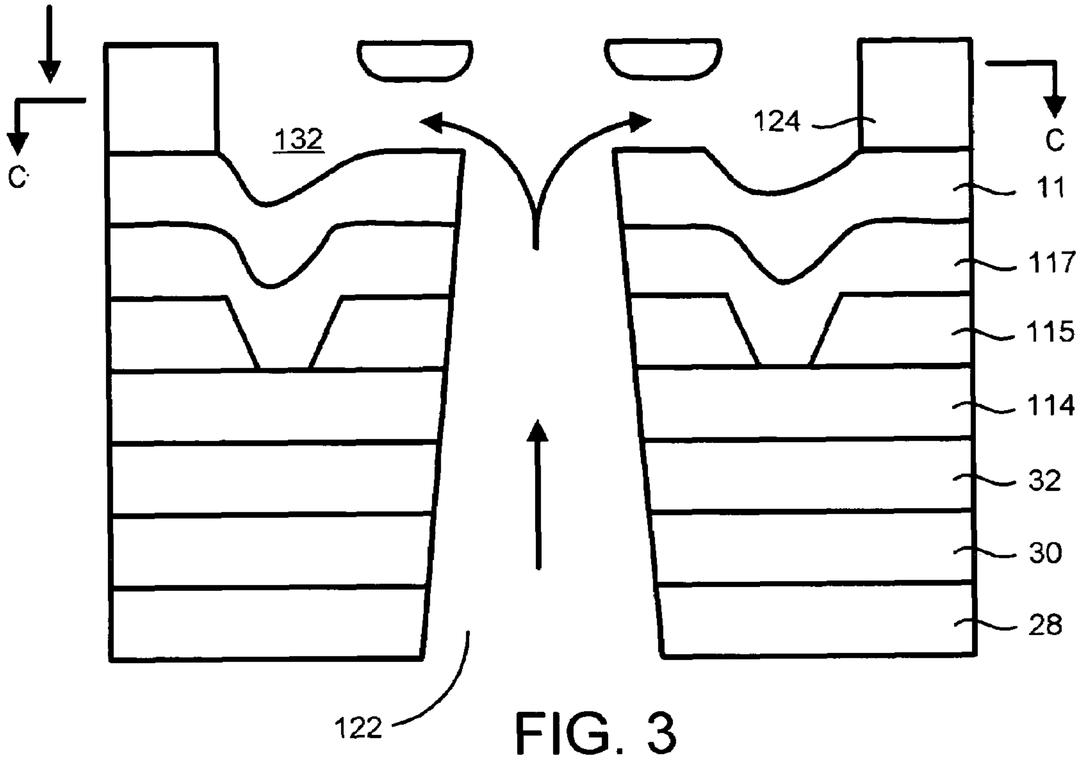
FIG. 3 illustrates the structure of FIG. 2B with the slot region removed.

The resistive layer 114 and the conductive layer 115 are patterned, such as by photolithography, and etched. As shown in FIG. 3 and in FIG. 4, an area of the conductor layer 115 has been etched out to form individual resistors 134 from the resistor layer 114 underneath the conductor traces 115. In one embodiment, a mask is applied and etched to define the resistor heater width and conductor traces. A subsequent mask is used similarly to define the heater resistor length and aluminum conductor 115 terminations.

An insulating passivation layer 117 is formed over the resistors and conductor traces to prevent electrical charging of the fluid or corrosion of the device, in the event that an electrically conductive fluid is used. Passivation layer 117 may be formed of any suitable material such as silicon dioxide, aluminum oxide, silicon carbide, silicon nitride, and glass, and by any suitable method such as sputtering, evaporation, and PECVD. Generally, the passivation layer has a thickness of up to about 1 to 2 microns.

In one embodiment, a PECVD process is used to deposit a composite silicon nitride/silicon carbide layer 117 to serve as component passivation. This passivation layer 117 has a thickness of approximately 0.75 micron. In another embodiment, the thickness is about 0.4 microns. The surface of the structure is masked and etched to create vias for metal interconnects. In one embodiment, the passivation layer places the structure under compressive stress.

A cavitation barrier layer 119 is added over the passivation layer 117. The cavitation barrier layer 119 helps dissipate the force of the collapsing drive bubble left in the wake of each ejected fluid drop. Generally, the cavitation barrier layer has a thickness of up to about 1 to 2 microns. In one embodiment, the cavitation barrier layer is tantalum. The tantalum layer 119 is approximately 0.6 micron thick and serves as a passivation, anti-cavitation, and adhesion layer. In one embodiment, the cavitation barrier layer absorbs energy away from the substrate during slot formation. Tantalum is a tough, ductile material that is deposited in the beta phase. The grain structure of the material is such that the layer also places the structure under compressive stress. The tantalum layer is sputter deposited quickly thereby holding the molecules in the layer in place. However, if the tantalum layer is annealed, the compressive stress is relieved.

Figure 2C:
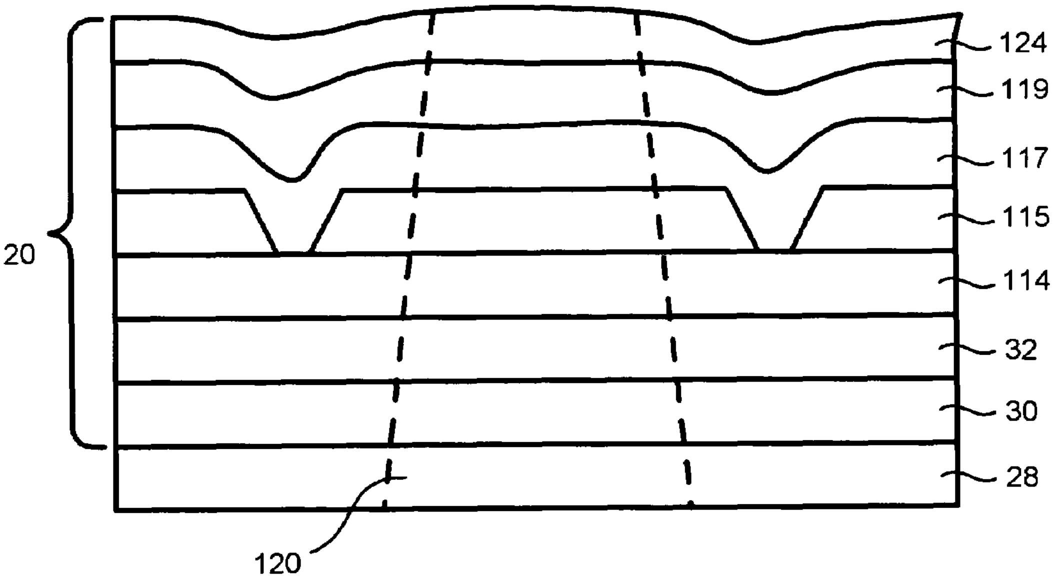
FIG. 2C illustrates the structure of FIG. 2B with the barrier layer applied thereon.
Figure 2D:
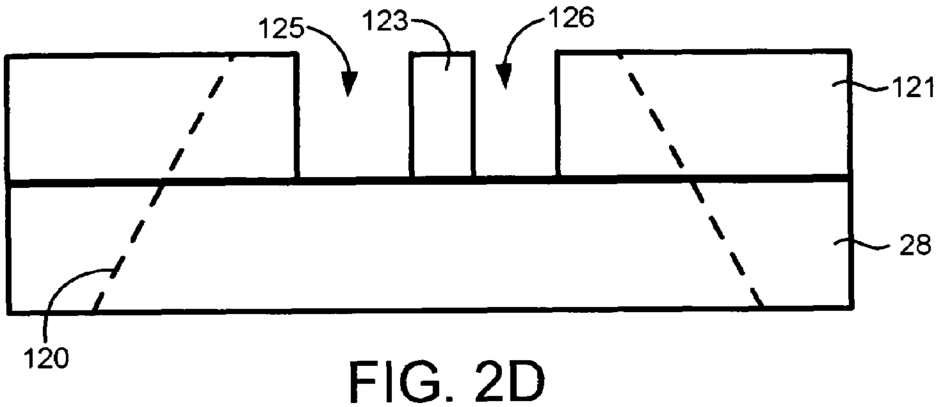
FIG. 2D illustrates a side cross-sectional schematic view through A-A of FIG. 1, wherein the thin film coating has been partially patterned over the substrate.

FIG. 2D illustrates a side cross-sectional schematic view through A-A of FIG. 1, with a thin film. The thin film 121 has been partially patterned over the substrate 28. In general, as the thin film 121 is patterned over the substrate 28, a portion 123 of the thin film 121 is partially patterned within the slot region 120. An area of the slot region 120 is removed all the way through the thin film 121 and the substrate 28, as shown by the dashed lines. A single voided area or multiple voided areas 125, 126 of the thin film 121 represent the partially patterned area 123.

Figure 2E:
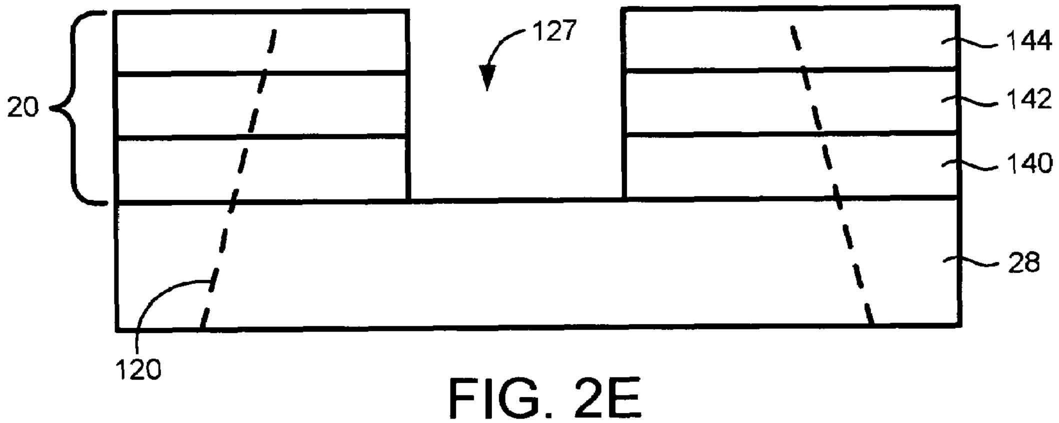
FIG. 2E illustrates a side cross-sectional schematic view through A-A of FIG. 1, wherein plural thin film layers are used and all the layers have been partially patterned over the substrate.

FIG. 2E illustrates a side cross-sectional schematic view through A-A of FIG. 1, with a thin film stack 20 with plural layers 140, 142, 144 that are partially patterned over the substrate 28. As shown in FIG. 2E, plural thin film layers 140, 142, 144 are partially patterned over the substrate 28. Each layer of the thin film stack 20 can be configured so that an area 127 is not covered in a slot region 120. The layers 140, 142, 144 of FIG. 2E are shown to be partially patterned near the middle of the slot region 120 for illustrative purposes only. Any suitable location could be partially patterned in the slot region 120 with single or multiple portions of the layer being partially patterned.

Figure 2F:
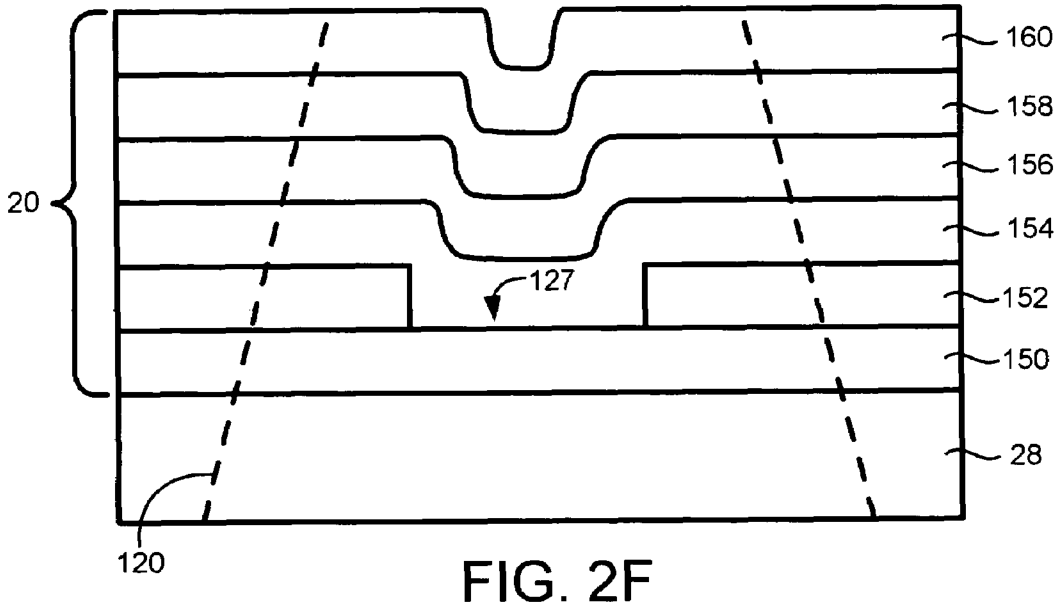
FIG. 2F illustrates a side cross-sectional schematic view through A-A of FIG. 1, wherein plural thin film layers are used and at least one layer has been partially patterned over the substrate.

FIG. 2F illustrates a side cross-sectional schematic view through A-A of FIG. 1, with a thin film stack 20 with plural layers 150, 152, 154, 156, 158, 160 that are configured over the substrate 28 so that at least one layer 152 of the thin film stack 20 is configured so that at least an area 127 of the layer 152 is patterned in a slot region 120. FIG. 2F shows layer 152 partially patterned in the slot region 120 for illustrative purposes only. Any single layer or multiple layers could be partially patterned in the slot region 120 with single or multiple portions of the layer being partially patterned.

Figure 2G:
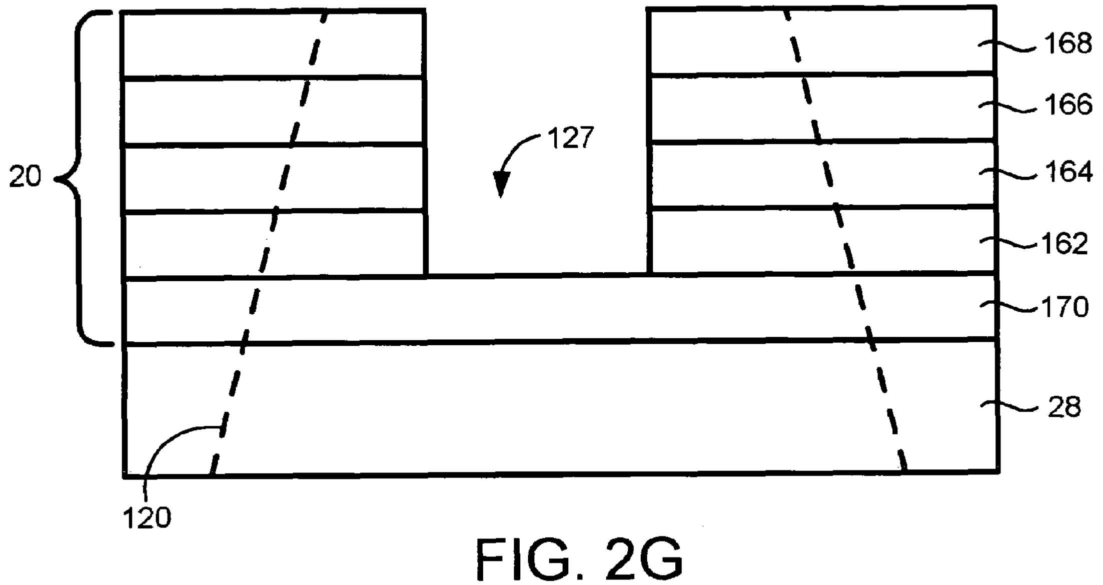
FIG. 2G illustrates a side cross-sectional schematic view through A-A of FIG. 1, wherein plural thin film layers are used and all the layers except the layer directly above the substrate have been partially patterned over the substrate.

FIG. 2G illustrates a side cross-sectional schematic view through A-A of FIG. 1. Plural thin film layers 162, 164, 166, 168 are partially patterned over substrate 28. However, layer 170, which is directly above the substrate 28, is not partially patterned over the substrate 28. Each patterned layer 162, 164, 166, 168 of the thin film stack 20 can be configured so that an area 127 is not covered in a slot region 120. The layers 162, 164, 166, 168 of FIG. 2G are shown to be partially patterned in the middle of the slot region 120 for illustrative purposes only. Any suitable location could be partially patterned in the slot region 120 with single or multiple portions of the layer being partially patterned.

Figure 2H:
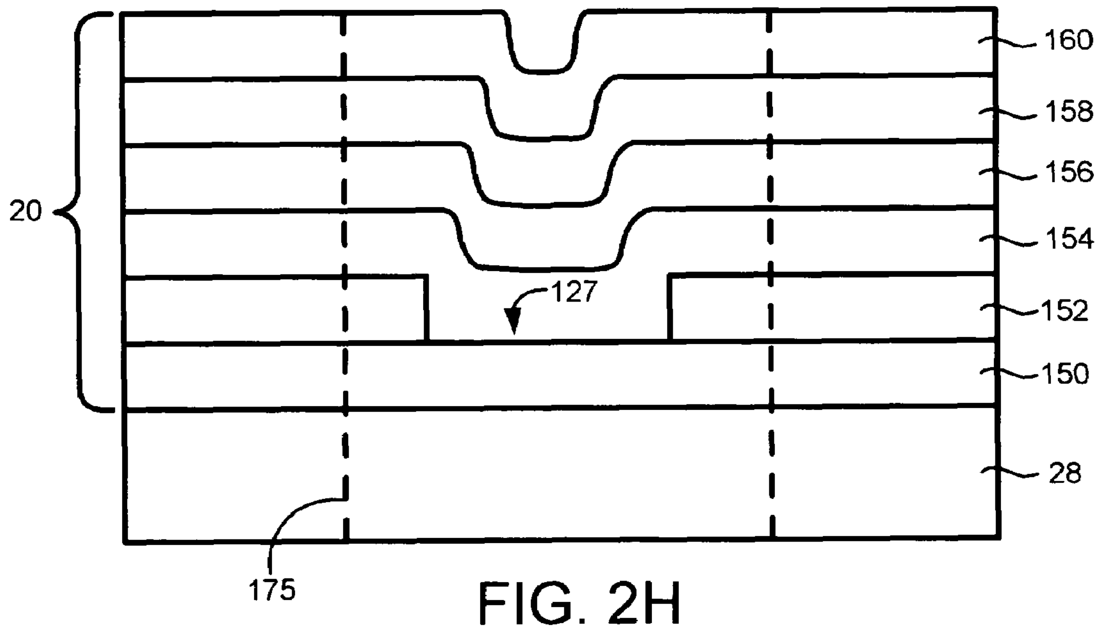
FIG. 2H illustrates a side cross-sectional schematic view through A-A of FIG. 1, wherein plural thin film layers are used and at least one layer has been partially patterned over the substrate to create an alternative slot.

FIG. 2H illustrates a side cross-sectional schematic view through A-A of FIG. 1, wherein plural thin film layers are used and at least one layer has been partially patterned over the substrate to create an alternative slot. Substrates can be micromachined with sand drills, slurry jets, wire saws, and dicing saws. A hard material, such as diamond granules (either a flow or a moving solid), can be used to abrade the feature, which can be a slot, trench, or full length cut. Coverage of the area over the subsequent shelf edge with one or more film layers reduces chip formation with many types of abrasive micromachining methods. FIG. 2H shows a slot region 175 with parallel edges illustrated by the dotted lines that are to be micromachined. However, any suitable geometry for the slot region can be micromachined.

Referring to FIGS. 2D and 2H, a slot is formed through the slot region 120 that extends through the substrate 28 and the thin film 121 of FIG. 2D and the thin film stacks 20 of FIGS. 2E-2H. In an alternative embodiment, the slot is created as a blind trench. In other words, the slot that is created does not go all the way through all of the layers. When the cutting device traverses through the slot region 120 and thin film 121 of FIG. 2D and the thin film stacks 20 of FIGS. 2E-2H, chip count is minimized in a shelf surrounding the slot due to the patterning, as discussed in detail below. Also, as described above, the thin film layer 121 of FIG. 2D and the thin film stacks 20 of FIGS. 2E-2H can comprise of any suitable materials. For example, the layers can be a ductile thin film layer, an insulating dielectric barrier layer, an interdielectric thin film layer and a resistive layer.

As shown in FIG. 3, a drill slot 122 is formed in the substrate and thin film stack in the general area of the slot region 120. One method of forming the drill slot is abrasive sand blasting. A blasting apparatus uses a source of pressurized gas (e.g. compressed air) to eject abrasive particles toward the substrate coated with thin film layers to form the slot. The gas stream carries the particles from the apparatus at a high flow rate (e.g. a flow rate of about 2-20 grams/minute). The particles then contact the coated substrate, causing the formation of an opening therethrough.

Abrasive particles range in size from about 10-200 microns in diameter. Abrasive particles include aluminum oxide, glass beads, silicon carbide, sodium bicarbonate, dolomite, and walnut shells.

In one embodiment, abrasive sand blasting uses aluminum oxide particles directed towards the slot region 120. Pressure of about 560 to 610 kPa is used in sand blasting. The type of sand that is used is 250 OPT.

Substrates, including metals, plastics, glass, and silicon, may have slots formed therethrough in the present invention. However, the invention shall not be limited to the cutting of any specific substrate material. Likewise, the invention shall not be limited to the use of any particular abrasive powder. A wide variety of different systems and powders may be used.

As shown in FIG. 3, a polymer barrier layer 124 is deposited over the cavitation barrier layer 119. Generally, the barrier layer has a thickness of up to about 20 microns. In one embodiment, the barrier layer 128 is comprised of a fast cross-linking polymer such as photoimagable epoxy (such as SU8 developed by IBM), photoimagable polymer or photosensitive silicone dielectrics, such as SINR-3010 manufactured by ShinEtsu™.

In another embodiment, the barrier layer 124 is made of an organic polymer plastic which is substantially inert to the corrosive action of ink. Plastic polymers suitable for this purpose include products sold under the trademarks VACREL and RISTON by E. I. DuPont de Nemours and Co. of Wilmington, Del. The barrier layer 124 has a thickness of about 20 to 30 microns.

In one embodiment, the barrier layer 124 is applied and patterned before the slot is drilled. In this embodiment, the drill slot region 120 ends in the cavitation barrier layer 119, as shown in FIG. 2B.

In another embodiment, the slot region 120 extends through the barrier layer 124, as shown in FIG. 2C. In this embodiment, the abrasive sand blasting process is applied through the barrier layer 124. The properties in the material of the barrier aid in reducing the number of chips in the shelf in slot formation. The polymer barrier material absorbs energy away from the substrate during slot formation, thereby dampening the effect on the substrate structure. Crack propagation through the substrate, and chipping in the shelf tends to slow, and reduce, as a result.

In one embodiment, the barrier layer 124 includes orifices through which fluid is ejected, as discussed in this application. In another embodiment, an orifice layer is applied over the barrier layer thereby forming orifices over firing chambers 132, as described in more detail below.

Figure 4:
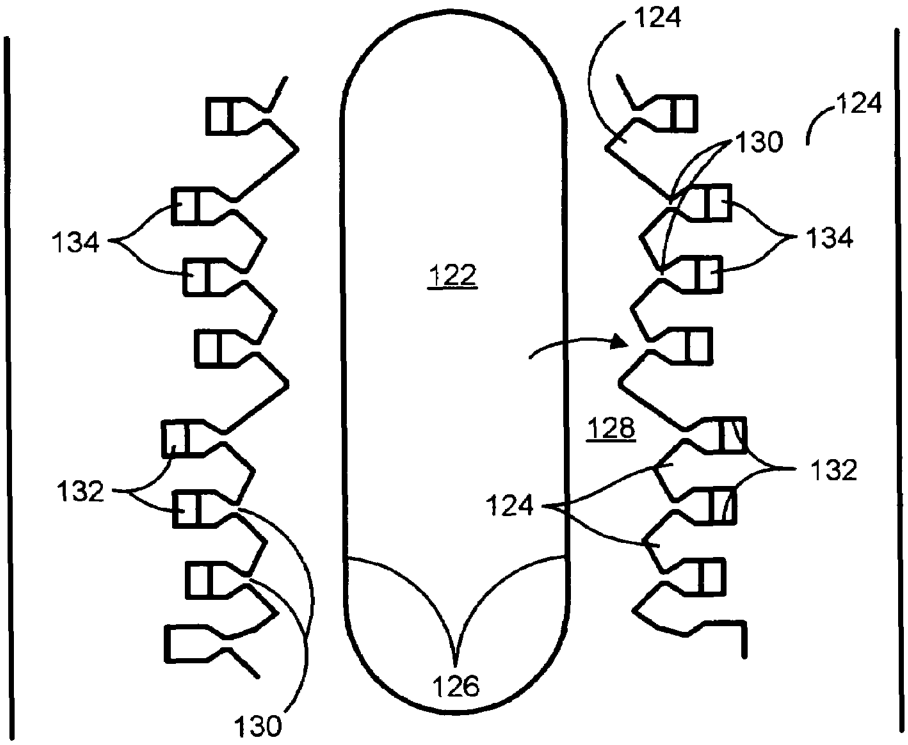
FIG. 4 illustrates the structure of FIG. 3 through section C-C.

FIG. 4 illustrates the structure of FIG. 3 through section C-C (the barrier layer), a plan view of the coated substrate. The substrate usually has a rectangular shape, with the slot 122 disposed longitudinally therein, as shown in FIG. 4. The plastic barrier layer 124 is masked and etched 224 to define a shelf 128, fluid flow channels 130, and firing chambers 132. The shelf 128 surrounds the slot 122 and extends to the channels 130. Each firing chamber 132 has at least one fluid channel 130. The fluid channels 130 in the barrier layer have entrances for the fluid running along the shelf 128. As shown by directional arrows illustrated in FIG. 3, a fluid supply (not shown) is below the substrate 28 and is pressurized to flow up through the drill slot 122 and into the firing chambers 132. As shown in the arrow of FIG. 4, the fluid channels direct fluid from the slot to corresponding firing chambers 132.

In each firing chamber 132 is a heating element 134 that is formed of the resistive material layer 114 and coated with passivation and cavitation barrier layers (shown in FIG. 3). Propagation of a current or a "fire signal" through a heating element causes fluid in the corresponding firing chamber to be heated and expelled through a corresponding nozzle.

The heating elements 134 and the corresponding firing chambers 132 are arranged in rows located on both sides of the slot 122 and are spaced approximately equal distances from the slot so that the ink channel length at each resistor is approximately equal. The width of the print swath achieved by one pass of a printhead is approximately equal to the length of the resistor rows, which in turn is approximately equal to the length of the slot.

In an alternative embodiment of the present invention, there are multi-slotted dies, and dies that are adjacent each other in the printhead 14. Slot to slot distance within a multi-slotted die, and from die to die, is decreased by up to approximately 20% due to the decrease in chip size and number in the shelf using the present invention of coating the substrate before forming the slot. Drill yield (the number of die that are within specification limits after drilling) increased by up to about 25-27% using the method of the present invention. The chip yield loss (the yield loss due to chipping) also decreased by up to about 30%. The high correlation between the drill yield and chip yield loss is due to the fact that chipping is the largest yield loss factor.

In a first embodiment, where a patterned FOX layer, a PSG layer and a passivation layer were deposited onto a substrate, the slot yield was approximately 83%. In a second embodiment, where a patterned FOX layer, a PSG layer, a passivation layer and a tantalum layer were deposited onto a substrate, the slot yield was approximately 87%. The percentage difference between the first and second embodiments is statistically significant at the 95% confidence level. In a third embodiment, where an unpatterned FOX layer, a PSG layer, a passivation layer, a TaAl/Al layer, and a Tantalum layer were deposited onto a substrate, the slot yield was approximately 88%.

In the present invention, the thin film layers applied over the substrate before drilling reduces the number of chips by up to about 90%. In one embodiment, the number of chips greater in length than about ¼ of a slot width is less than or equal to about 40. (A slot width is typically about 150 to 200 microns. In one embodiment, slot width is about 170 microns, and the length of the chips counted is about 40 microns.) In another embodiment, the number of chips is less than or equal to about 10. In particular, in one embodiment where FOX, passivation, aluminum, tantalum aluminum and tantalum is deposited over the silicon substrate, a chip count is between about 10 chips and about 30 chips.

The foregoing has described the principles, preferred embodiments and modes of operation of the present invention. However, the invention should not be construed as being limited to the particular embodiments discussed. For example, layers that are applied over the substrate in other embodiments for forming printheads, such as Gate Oxide (GOX) layers, Gold, polymer layers used for barrier materials, and polysilicon may be deposited over the substrate.

In an embodiment, one layer is applied over the substrate. Alternatively, more than one layer is applied over the substrate. Further, the present invention is not limited to the order of the layers illustrated. The present invention includes placing the above-mentioned layers in any order. In particular, one or more of the following layers may be applied over the substrate: a layer of ductile material, a metal, a material under compression, a resistive material (such as tantalum aluminum), a conductive material (such as aluminum), a cavitation barrier layer (such as tantalum), a passivation layer (such as silicon nitride and silicon carbide), an insulating layer grown from the substrate (such as FOX), PSG, a polymer layer, and a dielectric layer, in any combination.

In one embodiment, the thickness of the thin film stack over the slot region ranges from 0.25 micron up to about 50 microns. In another embodiment, the thickness of the film is at least about 2½ microns. In another embodiment, the thickness of the film is at least about 3 microns.

In addition, the slot in the substrate may be formed by another mechanical method, such as diamond saw cutting, or may be formed by laser cutting/ablation. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of forming a slotted substrate, the method comprising:

configuring at least four thin film layers over a substrate, wherein one of the thin film layers is a metal thin film layer, one of the thin film layers is an insulating dielectric barrier layer, one of the thin film layers is an interdielectric thin film layer and one of the thin film layers is a resistive layer and wherein at least one of the layers is configured so that at least a portion of the at least one layer does not cover at least a portion of one of the thin film layers underneath it in a slot region; and forming a slot in the substrate through the slot region in a shelf surrounding the slot to minimize a chip count in the shelf that extends through the substrate and the thin film layers.

2. A method of forming a slot in a substrate comprising:

patterning plural thin film layers over a substrate, wherein one of the layers is a ductile thin film layer, one of the thin film layers is an insulating dielectric barrier layer, one of the thin film layers is a cavitation barrier layer, one of the thin film layers is an interdielectric thin film layer and one of the thin film layers is a resistive layer and wherein the bottom layer is configured to cover at least a portion of the substrate and each plural layer is configured to cover at least a portion of one of the thin film layers underneath it; and layering the plural thin film layers in a predefined patterned order and then extending the slot through the ductile thin film layer and the substrate defined by a slot region in a shelf surrounding the slot to minimize a chip count in the shelf.

3. The method of claim 2 wherein the interdielectric thin film layer is an insulating glass layer.

4. The method of claim 2 wherein the resistive thin film layer is a Tantalum Aluminum resistive layer.

5. The method of claim 2 wherein the plural thin film layers are patterned in a compressive state.

6. The method of claim 2 wherein the thin film contains a passivation layer.

7. The method of claim 2 wherein the thin film contains an insulating layer grown from the substrate.

* * * * *